Oct. 13, 1959 R. L. GREENBERG 2,908,298
DEPOSITORS FOR CONFECTIONERY MACHINES
Filed Dec. 30, 1957 2 Sheets-Sheet 1

INVENTOR.
Robert L. Greenberg
BY Harry Radzinsky
Attorney

Oct. 13, 1959   R. L. GREENBERG   2,908,298
DEPOSITORS FOR CONFECTIONERY MACHINES
Filed Dec. 30, 1957   2 Sheets-Sheet 2

INVENTOR.
Robert L. Greenberg
by Harry Rodginsky
Atty.

United States Patent Office 2,908,298
Patented Oct. 13, 1959

2,908,298

DEPOSITORS FOR CONFECTIONERY MACHINES

Robert L. Greenberg, Englewood, N.J., assignor to National Equipment Corporation, New York, N.Y., a corporation of New York Application December 30, 1957, Serial No. 706,029

2 Claims. (Cl. 141—137)

This invention relates to confectionery machines, and more particularly to the mechanism employed for controlling the movements of a depositor which dispenses the candy material into mold cavities formed in the starch contents of trays that are moved below the nozzles of the depositor. The mechanism to be hereinafter described is also applicable to machines in which the deposits are made on a travelling belt as distinguished from separate trays.

It is an object of the invention to provide a depositor-moving means by which a row of nozzles will always be aligned with each row of mold cavities disposed below the nozzles; which nozzles shall move with the tray while depositing and shall be shut off while retracting into position for depositing in the following row of mold cavities.

It is an object of the invention to provide means by which the depositing device or pump shall, at predetermined times, be caused to skip or omit one or more deposits thereby permitting the trays to be moved from the position in which the last row of mold cavities in one tray was located under the nozzles, to a position in which the first row of mold cavities in the succeeding tray reaches the receptive position relatively to the nozzles.

It is an object of the invention to provide means for controlling the feeding operations of the depositor in a manner to compensate for distances between the last row of mold cavities in one tray and the first row of mold cavities in the succeeding tray to thereby always provide accurate registry of the nozzles with the mold cavities as one tray after another is passed below the depositor nozzles.

With these, and other objects to be hereinafter set forth in view, I have devised the arrangement of parts to be described and more particularly set forth in the claims appended hereto.

Figure 1:
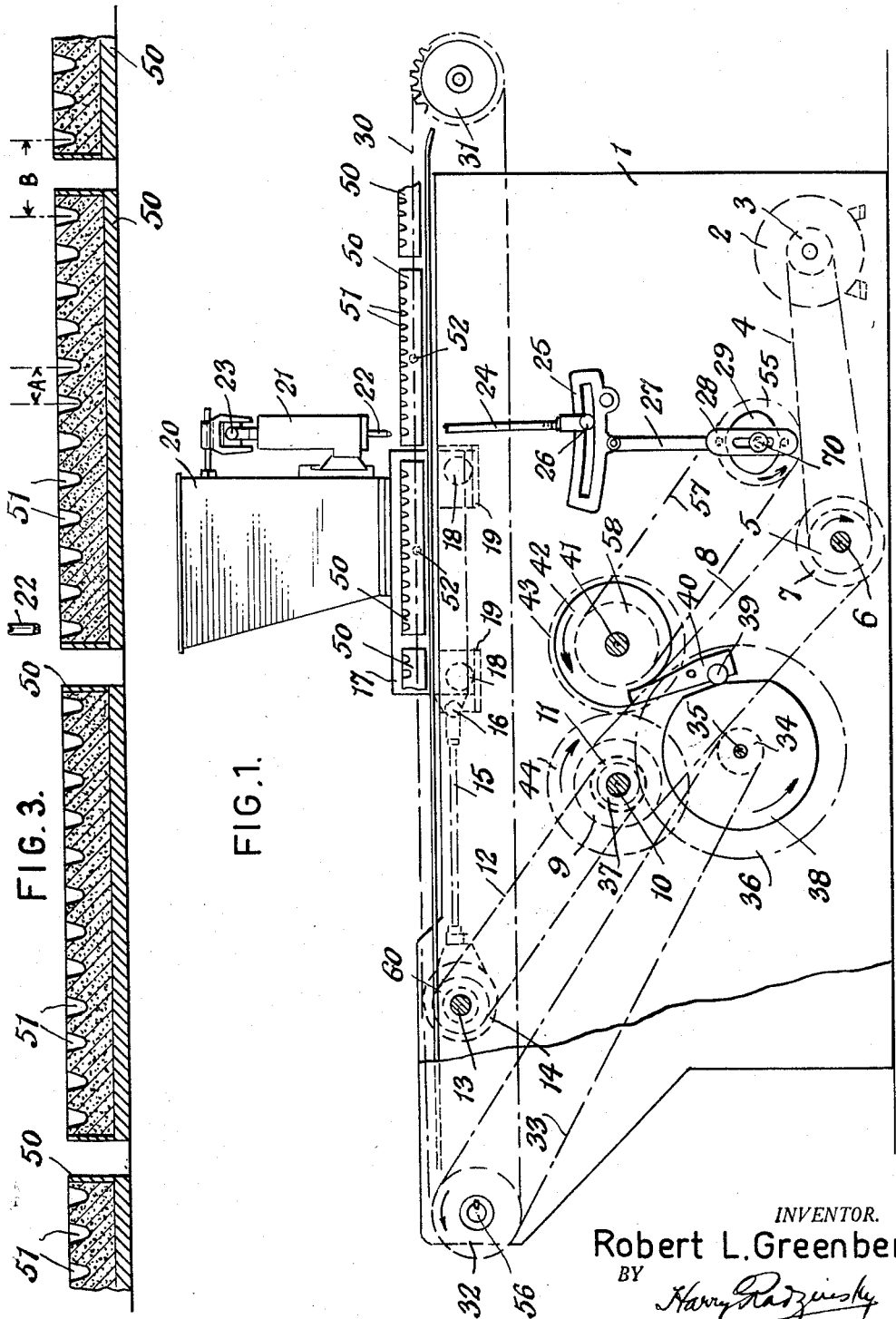
Figure 2:
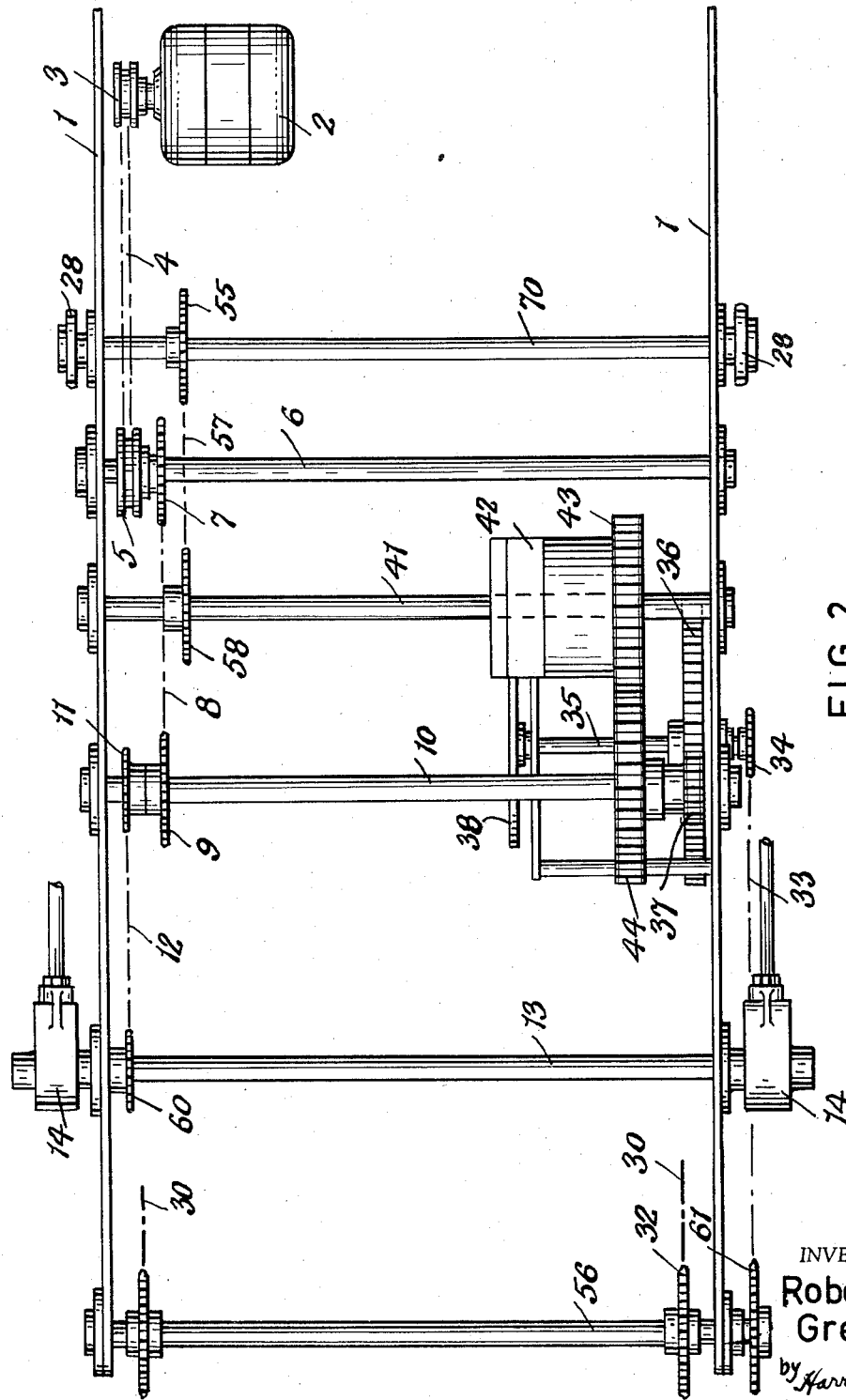

In the accompanying drawings, wherein an illustrative embodiment of the invention is disclosed, Fig. 1 is a side elevational view, with some of the parts shown diagrammatically, of the improved depositor mechanism, Fig. 2 is a top plan view of the driving mechanism, and Fig. 3 shows the positions of the trays as moved by the conveying means.

Referring to the drawings, 1 indicates the two side frames of the apparatus, and suitably mounted between the same is an electric motor 2, which may drive, through a gear reduction device, a pulley 3, engaged by the belt 4 which extends around a pulley 5, located on a jack shaft 6 rotative in the frame members 1. Jack shaft 6 carries a sprocket 7 engaged by a chain 8 which extends to and engages around a drive shaft 10 rotative in the frame members 1. Shaft 10 carries a gear 44 which is in mesh with a similar gear 43 carried on a clutch shaft 41, so that the shaft 10 and the clutch shaft 41 are driven in opposite direction and at the same speed.

Provided on the shaft 10 is a small gear 11 in mesh with a larger gear 36 carried on a cam shaft 35 which carries a cam 38 engaged by the roller 39 on a pivoted trip lever 40. Said lever 40 is operative on a one-revolution clutch of known construction, shown at 42, on shaft 41, and its manner of operation will be later described. Shaft 35 carries a sprocket 34, engaged by the chain 33 which extends to sprocket 61 (Fig. 2) on the conveyor shaft 56. Sprockets 32, mounted on the shaft 56 engage the conveyor chains 30, which extend for the length of the apparatus and at the opposite end of the same extend around the sprockets 31 (Fig. 1).

The mold trays, shown at 50 contain starch provided with rows of uniformly-spaced mold recesses or cavities 51 intended to receive the confectionery material from a depositor which may be of known construction, such as shown for example, in the patents to Perkins, Nos. 2,510,317, 2,764,322, 2,765,962 and 2,771,225, and possibly in other patents. In the present construction, the depositor includes a tank or reservoir 20 containing the candy material, pump housing 21, outlet nozzles 22 and the pump-operating crank 23. The crank 23 is coupled to a reciprocating mechanism, including the connecting rod 24, having a pin 26, engaging in the arcuate slot of the segment 25, connected to eccentric rod 27, having a slotted head 28 reciprocated by the action of a cam 29 on shaft 70. Shaft 70 carries a sprocket 55 engaged by a chain 57 extending around a sprocket 58 mounted on the clutch shaft 41. This arrangement is such that the pump 21 is operated one stroke for each row of the mold depressions 51 and each time that the confectionery material is ejected from the pump, a row of the mold depressions 51 will be located below the row of outlet nozzles and be filled by the candy material thus dispensed.

The depositor is mounted upon a carriage shown at 17, and said carriage includes wheels 18 which ride back and forth upon rails or supporting plates 19. Thus, the entire pump mechanism or depositor reciprocates horizontally for a limited extent, its reciprocating movement being caused by the eccentric 14 provided on the shaft 13, said shaft being rotated by chain 12 extending around the sprocket 60 on the shaft 13, the chain 12 engaging a sprocket 11 on the shaft 10.

The trays 50 are maintained in definite predetermined spacing on the chain conveyor 30 by means of pins 52 which engage either the trays or receptacles in which the trays are removably fitted. The trays travel continuously, toward the left as viewed in Fig. 1, and during such movement, the depositor with its row of nozzles 22 located directly over one of the rows of mold cavities 51 moves along with the tray and during such movement operates to fill the cavities in the row over which the nozzles are then positioned. At the end of its movement toward the left along with the tray, the depositor then moves backwardly or toward the right to bring its nozzles above the next row of mold cavities in the tray. While the tray travels the distance indicated at A in Fig. 3, the depositor deposits into the row of cavities 51 over which the nozzles are then located and then returns to its original position ready for the next row of cavities. The space between the last row of cavities in one tray and the first row in the following tray is indicated at B and this space is a multiple of the space A, which, for the purpose of explanation, is assumed to be twice the size of the space A.

In the operation of the apparatus, the motor 2 rotates the drive shaft 10 which, having its gear 44 in mesh with the gear 43, will rotate the shaft 41 through the one-revolution clutch 42. While the shaft 10 makes thirteen revolutions for a twelve deposit tray, the shaft 41 makes twelve revolutions and stops for one, and the eccentric shaft 70 makes twelve revolutions and stops for one. The shaft 10 makes one revolution while the tray travels the distance for one deposit.

The gear 37 on shaft 10 drives gear 36 with a one-to-thirteen ratio for a twelve-deposit tray and in general shaft 35 makes one revolution per tray. Shaft 35 on which gear 36 is mounted also carries a cam 38 operative on the trip lever 40 that engages the one-revolution clutch 42 to therefore stop shaft 41 for one revolution and at the proper time, and since shaft 41 drives the eccentric shaft 70 through chain 57, the pumping action of the depositor will also be halted for one stroke. At the proper time the cam 38 causes disengagement of the trip lever and the clutch 41 then rotates for its twelve revolutions for a twelve-deposit tray. In general, shaft 41 makes one revolution per deposit. It is understood that the twelve revolutions herein mentioned coincide with twelve rows of mold cavities in each tray, so that the depositor will deposit twelve times, and then skip one deposit during which time the space B will pass under the nozzles, thereby causing the nozzles to bridge the space between the two adjacent trays while not depositing and bring the nozzles over the first row of mold cavities in the succeeding tray.

While I have herein suggested that the dispensing operation of the depositor be ceased for one stroke to coincide with the movement of one tray from filling position to the position for filling of the first cavity row in the next tray, it will be understood that the dispensing operation might, if necessary, be ceased for two or more strokes according to the distance to be bridged between the last and first rows respectively of two adjacent trays. The strokes must be whole strokes and must be the equivalent of the distance between the rows of cavities, or twice the distance etc.

It is also to be understood that the mechanism herein disclosed for driving the depositor, the conveyor and other parts is illustrative, since various other means might be employed to drive the depositor with one or more skips in the feeding operation.

In order to utilize the described arrangement, the spacing between the rows of mold cavities as indictaed at A must always bear a fixed relationship to the skip distance indicated at B and to the total tray pitch. For example:

$P$ = Tray pitch
$N$ = Number of deposits per tray
$P = (N+1)A$
$B = 2A$

Having described a single embodiment of the invention, it is obvious that the same is not to be restricted thereto, but is broad enough to cover all structures coming within the scope of the annexed claims.

What I claim is:

1. In a confectionery depositing apparatus, means for continuously conveying a plurality of successively-arranged trays in uniformly spaced relation, with each of the trays containing material formed with regularly spaced rows of mold cavities and with the distance between the last row of cavities in each tray and the first row of cavities in the succeeding tray being a multiple of the distance between the rows of cavities in each tray, the improvements consisting in a reciprocating depositor having a pump operated at regular intervals and thus arranged to intermittently pump material to fill successive rows of cavities in each tray, and means for causing skip at regular intervals in the operation of the pump, which skip in pump operation is equal in time to the time required for the passage of one tray from the filling position for its last row of cavities to the bringing of the first row of cavities in the succeeding tray into such filling position, the skip in pump operation occurring without affecting the travel of the depositor or conveying means.

2. In a confectionery depositor, means for continuously conveying a plurality of mold-bearing trays in uniformly-spaced successive relation and with each of the trays carrying material formed with rows of cavities having uniform spacing between such rows and with the spacing between the last row of cavities in each tray and the first row of cavities in the succeeding tray being greater than the spacing between the rows of cavities in each tray, the improvements consisting in a reciprocating depositing device having outlet nozzles, means for reciprocating the depositing device above the trays, the depositing means including pump means intermittently operated at regular intervals for forcing material through the nozzles and into the successive rows of mold cavities in the trays, and means for causing the pump means to skip at least one pumping operation after the filling of the last row of cavities in each tray, and without halting the travel of the conveyer or depositor, to thereby enable the distance between the last row of cavities in a tray and the first row in a succeeding tray to be bridged by the pump without depositing.

References Cited in the file of this patent

UNITED STATES PATENTS

| | | |
|---|---|---|
| 1,169,602 | Bausman | Jan. 25, 1916 |
| 1,198,798 | Werner | Sept. 19, 1916 |
| 1,223,293 | Rose | Apr. 17, 1917 |
| 1,991,656 | Campbell | Feb. 19, 1935 |
| 2,262,640 | Greer | Nov. 11, 1941 |
| 2,522,031 | Gavin | Sept. 12, 1950 |
| 2,727,657 | Bagby | Dec. 20, 1955 |